United States Patent
Hourne (10) Patent No.: US 9,300,360 B2
(45) Date of Patent: Mar. 29, 2016

(54) DEVICE FOR COMMUNICATION BETWEEN AN ELECTRONIC MODULE AND A SENSOR

(71) Applicant: Xavier Hourne, Cugnaux (FR)

(72) Inventor: Xavier Hourne, Cugnaux (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 8 days.

(21) Appl. No.: 14/364,369

(22) PCT Filed: Dec. 17, 2012

(86) PCT No.: PCT/EP2012/005215
§ 371 (c)(1),
(2) Date: Jun. 11, 2014

(87) PCT Pub. No.: WO2013/091825
PCT Pub. Date: Jun. 27, 2013

(65) Prior Publication Data
US 2014/0355699 A1 Dec. 4, 2014

(30) Foreign Application Priority Data
Dec. 21, 2011 (FR) ...................................... 11 03968

(51) Int. Cl.
*H04B 3/54* (2006.01)
*H04L 29/08* (2006.01)

(52) U.S. Cl.
CPC .................. *H04B 3/54* (2013.01); *H04B 3/548* (2013.01); *H04L 67/12* (2013.01); *H04B 2203/547* (2013.01)

(58) Field of Classification Search
CPC ........... H04B 3/54; H04B 3/548; H04L 67/12
USPC ............................................................ 701/36
See application file for complete search history.

(56) References Cited

U.S. PATENT DOCUMENTS

| 5,635,896 | A | 6/1997 | Tinsley et al. |
| 6,326,772 | B2 | 12/2001 | Kusumoto et al. |
| 6,441,723 | B1 * | 8/2002 | Mansfield, Jr. ........ G08B 25/06 340/538 |

(Continued)

FOREIGN PATENT DOCUMENTS

| CN | 1239601 | 12/1999 |
| CN | 1783942 | 6/2006 |

(Continued)

OTHER PUBLICATIONS

International Search Report dated Jan. 30, 2013, corresponding to PCT/EP2012/005215.

*Primary Examiner* — Mussa A Shaawat
*Assistant Examiner* — Michael Berns
(74) *Attorney, Agent, or Firm* — Young & Thompson (57) ABSTRACT

A device for communication between a microcontroller (11) of an electronic module (10) and a microcontroller (22) of a sensor (20), the sensor being supplied with current by the electronic module (10) via a power supply line (W1), and:
the electronic module includes a command signal generator (40) generating a voltage-modulation command signal on the power supply line,
the sensor includes a command signal regulation device (30) connected to the power supply line, which includes:
a high-pass filter (FPH),
a voltage limiter (LT),
an open collector output (CO),
arranged such that the command signal at the output of the command signal regulation device is a voltage signal of constant mean value and included in the power supply voltage window of the microcontroller of the sensor.

14 Claims, 4 Drawing Sheets

(56) References Cited

U.S. PATENT DOCUMENTS

| | | |
|---|---|---|
| 6,744,820 B1 | 6/2004 | Khairallah et al. |
| 7,596,442 B2 * | 9/2009 | Aigner .................. B60R 16/03 |
| | | 701/36 |
| 2001/0006342 A1 | 7/2001 | Kusumoto et al. |
| 2006/0129851 A1 | 6/2006 | Will et al. |

FOREIGN PATENT DOCUMENTS

| | | |
|---|---|---|
| CN | 101350669 | 1/2009 |
| EP | 0 660 287 | 6/1995 |
| EP | 0932247 | 7/1999 |
| EP | 1 655 858 | 5/2006 |
| KR | 100 803 059 | 2/2008 |

* cited by examiner

DEVICE FOR COMMUNICATION BETWEEN AN ELECTRONIC MODULE AND A SENSOR

The invention relates to a device for communication between an electronic module and a sensor. More particularly, the invention proposes a device for communication between an electronic module on board a motor vehicle and a sensor remote from the electronic module and situated on said vehicle.

These days, motor vehicles comprise several electronic modules for controlling various sensors and/or actuators situated on the vehicle. Certain modules manage the sensors and/or the actuators of the drive train. They are called ECUs ("Engine Control Units"). Others manage the sensors and/or actuators situated in the body of the vehicle; they are called BCMs ("Body Control Modules"), that is to say control modules relating to the sensors and/or actuators situated in the body of the vehicle. The BCM therefore manages notably the sensors for detecting approach and/or contact which are situated in the door handles of the vehicle.

These approach and/or contact detection sensors are capacitive sensors known to those skilled in the art that detect the approach and/or contact of a hand of a user on a zone for locking or unlocking the handle. The capacitive sensor detects this approach and/or contact and then it sends an item of detection information to the BCM. The BCM receives this item of information and other items of information originating from other sensors and/or actuators of the vehicle, for example the item of information concerning the state of the handle (locked/unlocked), or the item of information concerning the identifier of the hands-free device for access to the vehicle, that is to say the key or the badge worn by the user. The microcontroller of the BCM then analyzes all these data in order to verify that the user is indeed authorized to access the vehicle and that a locking or unlocking can be carried out. If the user is authorized, the BCM then initiates the locking or the unlocking of the vehicle, that is to say that it commands the actuators for locking or unlocking the door.

Since the dimensions of the door handle of the vehicle are reduced, the latter usually contains only the detection sensor, that is to say a detection electrode, a microcontroller and associated electronics (electrical power supply for example). The detection is carried out by the microcontroller incorporated into the sensor, but the control of the locking or unlocking of the door is centralized in the BCM, on reception of the item of information concerning detection of approach and/or of contact sent by the microcontroller incorporated into the sensor and, depending on the case, as explained above, on receipt of other items of information originating from the vehicle.

Figure 1:
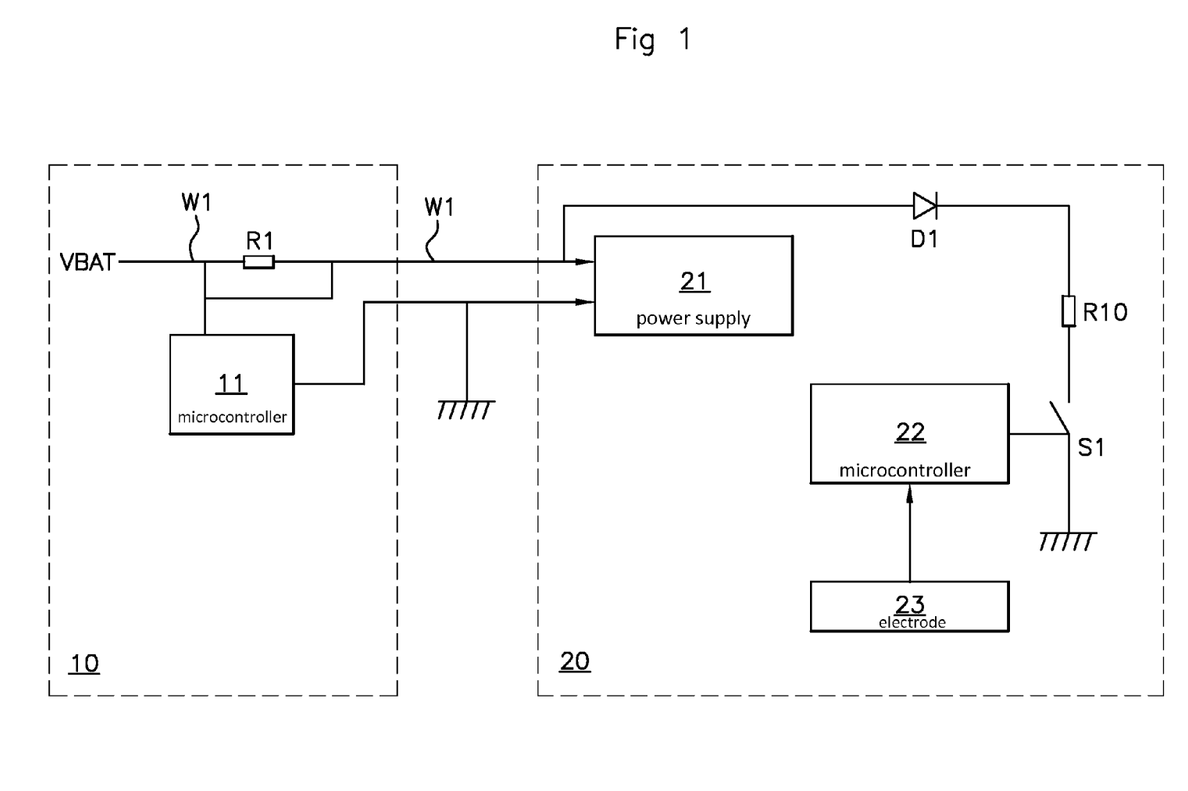
FIG. 1 represents the wiring diagram of a device for communication between an approach and/or contact detection sensor and a BCM according to the prior art.

There is therefore a one-way communication between the detection sensor and the BCM, since the sole function of the sensor is to inform the BCM when an approach has been detected. FIG. 1 represents the electronic diagram of the communication between the detection sensor 20 and the BCM 10. The BCM 10 comprises a microcontroller 11 connected to the battery voltage VBAT by the current power supply line W1, and connected to ground GND. The BCM 10 also comprises a resistor R1 situated on the power supply line W1. The microcontroller 11 of the BCM 10 is connected to the terminals of the resistor R1.

The sensor 20 comprises an electric power supply 21 directly connected to the battery voltage VBAT by the power supply line W1 and connected to ground GND by the BCM 10. The sensor 20 also comprises a microcontroller 22 connected to an electrode 23 for detecting approach and/or contact. The microcontroller 22 of the sensor 20 monitors the variation in the capacitance at the terminals of the electrode 23. When this capacitance exceeds a threshold, which means the approach and/or the contact of a hand of the user on the handle, the microcontroller 22 then sends an approach and/or contact detection signal to the BCM 10. For this, the microcontroller 22 closes a first switch S1. This closure creates a call for current through a resistor R10 and a diode D1 placed between the switch S1 and the power supply line W1 downstream of the resistor R1. This call for current is propagated to the BCM 10 and is then detected by the microcontroller 11 of the BCM 10 at the terminals of the resistor R1. By closing, according to a determined sequence, the switch S1, the microcontroller 22 of the sensor 20 thus sends an approach and/or contact detection signal to the microcontroller 11 of the BCM 10 by means of the power supply line W1. The microcontroller 11 of the BCM 10, after analysis of this detection signal, proceeds to the locking or unlocking.

This device is known to those skilled in the art.

However, the current trend is to add functionalities to the door handle of a vehicle, in particular to add for example a light source which will switch on depending on one or more precise events detected by the BCM 10. This light source, usually an LED (Light Emitting Diode), is incorporated into the sensor 20 and connected to the microcontroller 22.

This is done with the aim of comfort for the user or with the aim of esthetics. This light source is switched on for example when a certain darkness around the vehicle has been detected and when a user who is authorized to gain access to the vehicle has been detected close to the vehicle. The switching on of the light source may also be initiated after the user has left his vehicle and the doors have been closed in order to illuminate the locking zone situated on the handle on which he must press to lock his door. Or else, this light source is switched on when the user has touched the handle in order to illuminate the unlocking zone on which the user must press to unlock the openings of his vehicle and enter his vehicle. These events (presence of an authorized user around the vehicle, exit of the user, closure of the door, detection of contact on the handle, etc.) are detected by the BCM 10. It is therefore the BCM 10 that centralizes these items of information and, depending on the latter, sends a switch-on command signal to the light source.

More precisely, the switching on of this light source is controlled by the microcontroller 11 of the BCM 10 which coordinates the sending of the command signal to switch on the LED as a function of the items of information originating from the various sensors/actuators of the vehicle.

Figure 2:
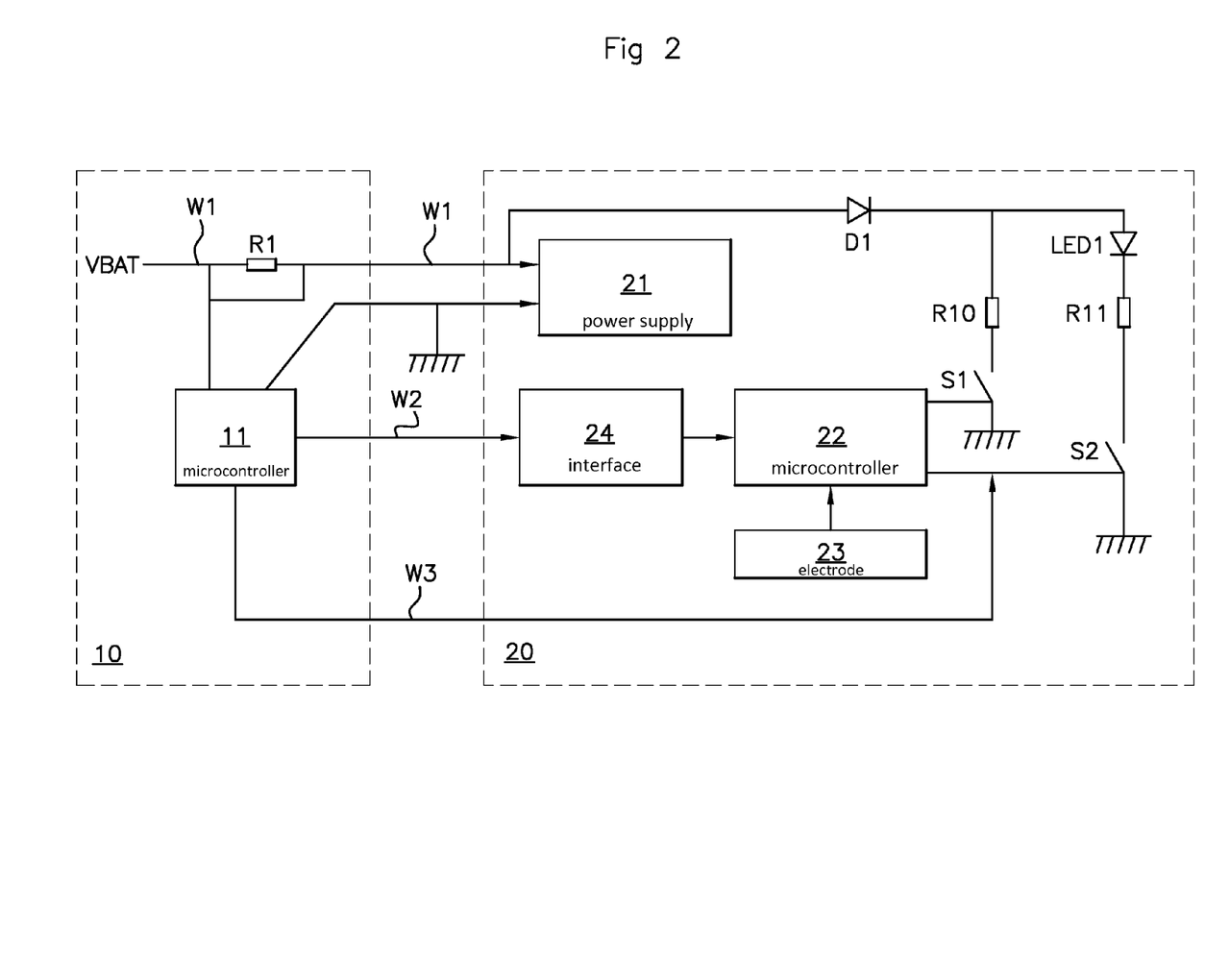
FIG. 2 represents the wiring diagram of a device for communication between a detection sensor fitted with an LED and a BCM according to the prior art.

According to the prior art, the control of switching on this light source by the microcontroller 11 of the BCM 10 is carried out by the addition of a supplementary wire link, that is to say by means of a wire communication, for example of the LIN, "Local Interconnect Network" bus type. This is illustrated in FIG. 2. The microcontroller 11 of the BCM 10 sends a signal to command the switching on of the light source to the sensor 20 via a wire communication W2 connected to an interface 24 situated in the sensor 20. This interface 24 formats the command signal and then sends it to the microcontroller 22 of the electrode 23. This interface 24 processes the signal that it receives from the BCM 10 so that it is compatible with the power supply voltage of the microcontroller 22 of the sensor 20. The microcontroller 22 of the sensor 20 then initiates, on receipt of the command signal, the switching on of the light source, in this example the switching on of an LED LED1, by closing a second switch S2. This closure creates a call for current through a resistor R11, and then through the LED LED1 in the direction of the BCM 10, which is connected to the battery voltage VBAT by the power supply line W1. The BCM 10 then supplies current via this same path to the LED LED1 which switches on.

Thus the wire communication W2 provides the communication in the direction from the microcontroller 11 of the BCM 10 to the microcontroller 22 of the sensor 20 in order to send the signal to command the switching on of the LED LED1. And the power supply line W1 supplies the LED LED1 with current (according to the switch-on command signal received by the microcontroller 22) in order to switch it on.

Other possibilities for commanding the LED LED1 may be envisaged. For example, a direct wire link W3 between the microcontroller 11 of the BCM 10 and the switch S2 controlling the call for current through the LED LED1 is possible, without passing through the microcontroller 22 of the sensor 20.

These solutions are robust but they have the drawback of requiring a supplementary wire link W2 or W3 in order to manage the communication from the BCM 10 to the sensor 20 in order to control an actuator (LED1) situated in the sensor 20.

It should be noted that other actuators situated in the door handle other than an LED can thus be controlled.

The addition of the wire link W2 (or W3) between the BCM 10 and the sensor 20 situated in the door handle comes with problems of integration because of the restricted space in the handle and problems of connection and cost for the BCM 10, since the latter must be modified specifically for the models of handles comprising an LED, and consequently a generic BCM common to all the models of handles can no longer be envisaged.

It is these problems that the invention proposes to solve. In this instance, the invention proposes to use the power supply line W1 to send a command signal from the microcontroller 11 of the BCM 10 to the microcontroller 22 of the sensor 20 in order to control the operation of an actuator (an LED LED1 for example) situated in the sensor 20. The advantage of the invention, when compared with the prior art, therefore lies in the removal of a second wire link (W2 or W3) between the BCM 10 and the sensor 20 to manage the operation of this actuator.

Therefore, the power supply line W1 is used not only for sending the approach-detection signal from the sensor 20 to the BCM 10 (as is the case in the prior art) and to supply the LED LED1 with current, but also to send the signal to command the switching on of this LED LED1 from the microcontroller 11 of the BCM 10 to the microcontroller 22 of the sensor 20.

The power supply line W1 according to the invention therefore allows a two-way communication between the sensor 20 and the BCM 10:
    in the sensor 20 to BCM 10 direction for sending the approach and/or contact detection signal,
    in the BCM 10 to sensor 20 direction for sending the signal to command an actuator (switching on the LED LED1).

However, a signal to command the switching on of the LED LED1, generated from the power supply line W1, (that is to say from the battery voltage VBAT) has the major drawback of not being in the power supply voltage window of the microcontroller 22 of the sensor 20 and of being of fluctuating mean value (depending on the calls for current of the various items of equipment of the vehicle to the battery). This type of signal is not compatible with the microcontroller 22 of the sensor and cannot be processed by the latter as a command signal. The invention therefore also proposes a communication device which, based on the battery voltage VBAT, supplies the microcontroller 22 of the sensor 20 with a command signal that is situated in the power supply voltage window of this microcontroller 22 and of which the mean voltage value is constant, so that the latter can use it as a command signal to control the switching on of an LED or to manage the operation of any other actuator situated in the handle.

The invention proposes a device for communication between a microcontroller of an electronic module and a microcontroller of a sensor in order to send a command signal from the microcontroller of the electronic module to the microcontroller of the sensor, said microcontroller of the sensor being furnished with a power supply voltage window, said sensor being supplied with current by the electronic module by means of a power supply line connected to a voltage, the invention lying in the following features:
    the electronic module comprises a command signal generator connected to the microcontroller of the electronic module and connected to the power supply line, generating a voltage-modulation command signal on the power supply line,
    the sensor comprises a command signal regulation device connected to the power supply line and to the microcontroller of the sensor,
    the command signal regulation device comprises:
        a high-pass filter,
        a voltage limiter,
        an open collector output,
    arranged such that the command signal at the output of the command signal regulation device is a voltage signal of constant mean value and of which the value is included in the power supply voltage window of the microcontroller of the sensor.

In a preferred embodiment, the device comprises the following features:
    the high-pass filter comprises a capacitor connected to a first resistor and second resistor mounted in parallel, and
    the voltage limiter comprises a first and second diode, arranged in such a way that:
        the first diode is connected in the on-state direction from ground to the output of the capacitor,
        the second diode is mounted, in the on-state direction, in parallel with the second resistor which is connected to the output of the capacitor, and
    the open collector output comprises a third and a fourth resistors and a transistor, arranged in such a way that:
        the third resistor is connected in series to the second resistor, and
        the third resistor is connected to a base input of the transistor, and
        a transmitter output of the transistor is connected to ground and a collector output is connected in parallel to the microcontroller of the sensor and to the fourth resistor.

Judiciously, the command signal generator comprises:
    a switch connected to ground, and
    a resistor.

Advantageously, the signal regulation device also comprises a switch connected to the microprocessor of the sensor and connected to the first resistor and the fourth resistor.

In one embodiment, the command signal is a signal for switching on a light source or for controlling an actuator incorporated into the sensor, and more particularly, the sensor is incorporated into a door handle of a motor vehicle and the voltage is the voltage originating from the vehicle battery.

In a second embodiment, the command signal is a signal for calibrating the sensor, which makes it possible to configure operating parameters of the sensor as a function of items of information received by the microcontroller of the electronic module. These items of information originate from various sensors and actuators situated on the vehicle.

The invention also relates to any motor vehicle comprising a communication device according to any one of the above features.

Other subjects, features and advantages of the present invention will better emerge from the following description given as a nonlimiting exemplary embodiment, made with reference to the appended schematic drawings in which.

FIGS. 1 and 2 have been explained above.

Figure 3:
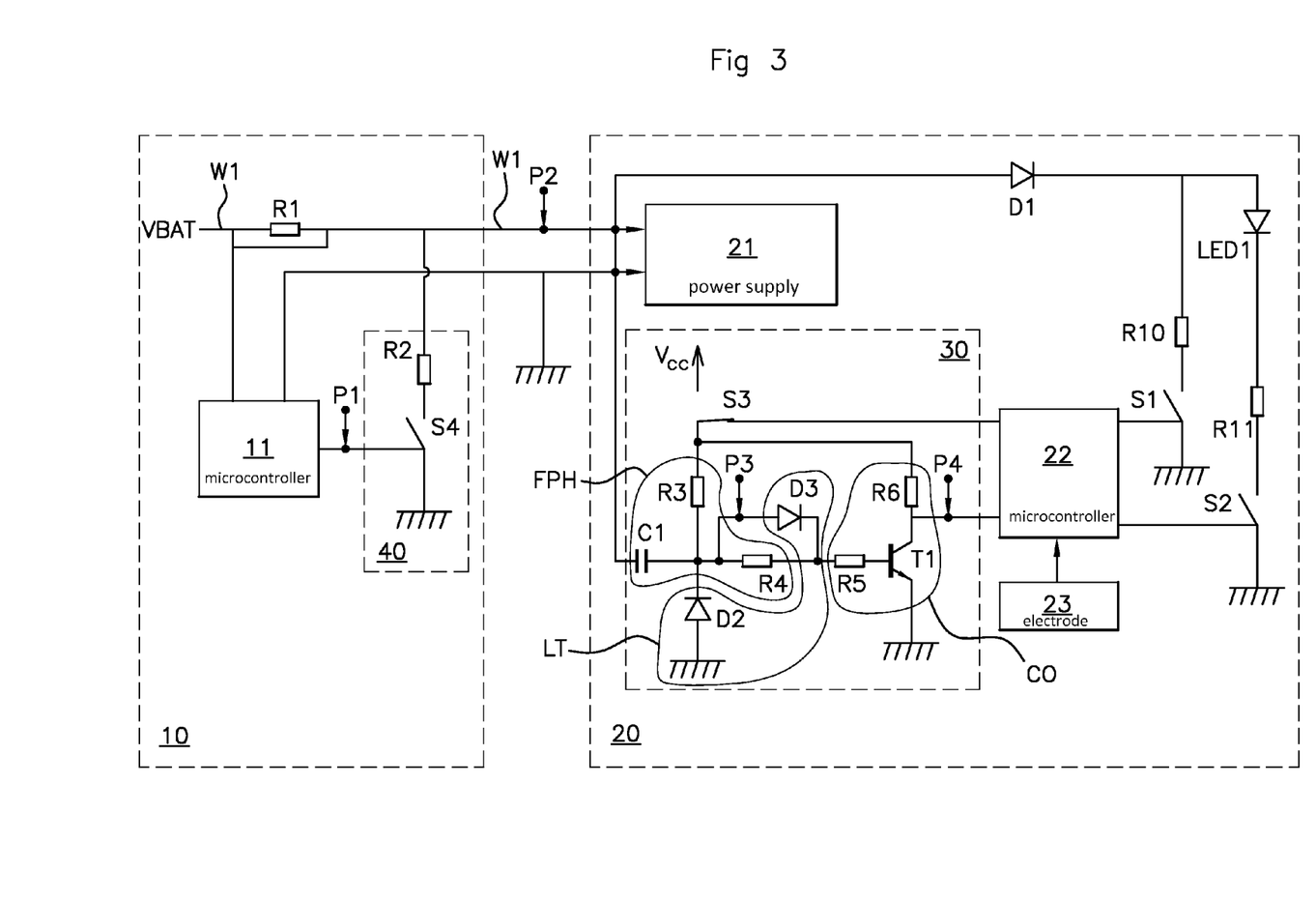
FIG. 3 represents the wiring diagram of a device for communication between a detection sensor fitted with an LED and a BCM according to the invention, FIG. 4 comprises graphs 4a, 4b, 4c and 4d and represents as a function of time the signal to command the switching on of the LED which command is sent from the BCM to the sensor at various points on the power supply line according to the invention.

FIG. 3 shows the two-way communication device according to the invention. The BCM 10 sends a signal to command the switching on of the LED LED1 to the sensor 20 via the power supply line W1.

The communication from the sensor 20 to the BCM 10 via the power supply line W1 is unchanged compared with the prior art. That is to say that the detection by the electrode 23 of the approach of the hand of the user produces a detection signal that is sent by the microcontroller 22 of the sensor 20 to the BCM 10 via the power supply line W1.

To carry out the communication from the BCM 10 to the sensor 20 in order to command the switching on of an actuator (LED 1) situated in the sensor 20, the invention proposes to add, at the output of the microcontroller 11 of the BCM 10, a command signal generator 40. This command signal generator 40 comprises a switch S4 (for example in the form of a transistor) and a resistor R2 which are connected to the power supply line W1. By closing the switch S4 according to a determined sequence, the microcontroller 11 of the BCM 10 generates a command signal, as voltage modulation on the power supply line W1, in the direction of the microcontroller 22 of the sensor 20. This command signal at the point P2, which is at a determined frequency, sustains the voltage fluctuations of the battery VBAT and it therefore has a fluctuating mean value. Its voltage, close to the battery voltage VBAT, is not situated in the power supply voltage window F (see FIG. 4b) of the microcontroller 22 of the sensor 20, which is usually situated well below the battery voltage VBAT. The command signal as it is at the output of the BCM 10 can therefore not be used by the microcontroller 22 of the sensor 20 as a signal to command the switching on of the LED LED1.

According to the invention, this command signal is sent to a signal regulation device 30 incorporated into the sensor 20 and connected to the microcontroller 22 of the sensor 20. The object of this signal regulation device 30 is to transform the command signal from the BCM 10 into a voltage signal of constant mean value and situated in the power supply voltage window F of the microcontroller 22 of the sensor 20 so that this microcontroller 22 can process it as a command signal.

This command signal regulation device 30 illustrated in FIG. 3 comprises a high-pass filter FPH, a voltage limiter LT and an open collector output CO, that is to say a type of output of a bipolar-technology logic integrated circuit, known to those skilled in the art.

The elements of the regulation device 30 are as follows:
the high-pass filter FPH which comprises a capacitor C1, a first and a second resistors R3 and R4,
the voltage limiter LT which comprises a first and a second diodes D2 and D3,
the open collector output CO which comprises a third and a fourth resistors R5 and R6 and a transistor T1,
the device also comprises a switch S3 connected to the microcontroller 22.

The elements are arranged in the following manner:
the output of the capacitor C1 is connected in parallel:
    to the input of the first resistor R3,
    to the output in the on-state direction of the first diode D2,
    to the input of the second diode D3,
    to the input of the second resistor R4, and
the output of the first resistor R3 is connected to the switch S3,
the first diode D2 is connected to ground,
the second diode D3 is coupled in the on-state direction in parallel to the second resistor R4 and connected to the terminals of this resistor,
the output of the second resistor R4 is connected in series to the input of the third resistor R5,
the output of the third resistor R5 is connected to the base of the transistor T1 of which a collector output is connected in parallel to the input of the microcontroller 22 and to the input of the fourth resistor R6 and of which another transmitting output is connected to ground,
the output of the fourth resistor R6 is connected to the switch S3.

The operation of the command signal regulation device 30 is explained below.

For the purposes of explanation, FIG. 4 illustrates the signal to command the switching on of the LED LED1 as a function of time t, at various locations on the power supply line W1 from the output of the microcontroller 11 of the BCM 10 to the input of the microcontroller 22 of the sensor 20:
graph 4a represents the command signal, at the point P1, generated by the microcontroller 11 of the BCM 10 (see FIG. 3),
graph 4b represents the command signal generated by the BCM 10 at the point P2 (see FIG. 3), that is to say at the output of the BCM 10, over the power supply line W1, and connected to the battery voltage VBAT,
graph 4c represents the command signal at the point P3, that is to say at the output of the high-pass filter FPH of the regulation device 30 (see FIG. 3),
graph 4d represents the command signal at the point P4 (see FIG. 3), that is to say at the output of the regulation device 30 and at the input of the microcontroller 22 of the sensor 20.

Figure 4A:
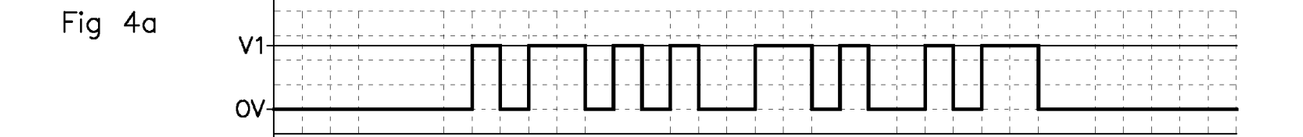

The command signal generated by the microcontroller 11 of the BCM 10 at the point P1 (see graph 4a) is a signal with a fixed frequency of amplitude V1 less than the battery voltage VBAT, for example V1=3.3 volts and VBAT=13 volts.

Figure 4B:
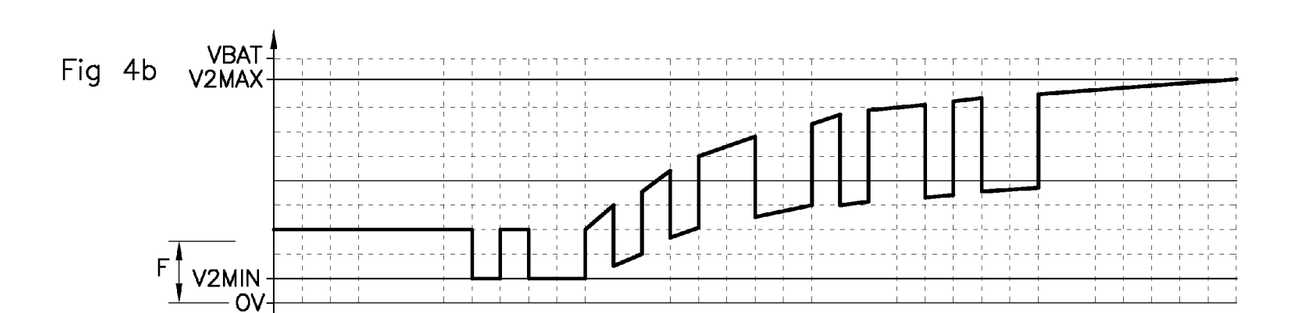

This command signal is transmitted to the sensor 20 via the power supply line W1. At the point P2, the command signal is a signal in modulation of the battery voltage VBAT. It has the same frequency as at the output of the microcontroller 11 at the point P1, but it is no longer referenced at 0 volts and its minimum value V2MIN is close to the value of the voltage VBAT. It is also inverted, in the case of our example, in which the switch S4 is a transistor. The command signal, at this point P2, oscillates between two voltage values V2MIN (for example 8 volts) and V2MAX (for example 11 volts). Since the battery voltage VBAT fluctuates ceaselessly (for example because of the fluctuations of the outside temperature or of the starting up of items of auxiliary equipment connected to the battery), the minimum and maximum values of the command signal V2MIN and V2MAX therefore fluctuate also and the command signal at this point P2 cannot be used by the microcontroller 22 of the sensor 20 as a command signal, as explained above.

Figure 4C:
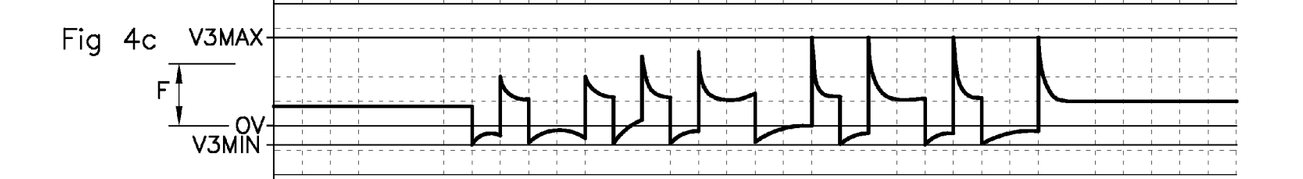

In FIG. 4c (at the point P3), after the high-pass filter FPH, the command signal has a maximum value V3MAX (of the order of 3 volts) and is referenced close to 0 volts. Its minimum value is V3MIN=−1 volt. It sustains further dynamic fluctuations originating from the battery, and is not included in the power supply voltage window F of the microcontroller that is [0; 2.5 V].

Figure 4D:
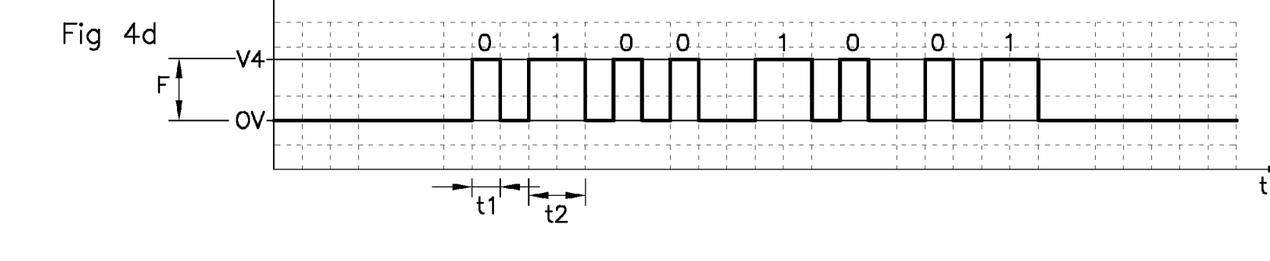

In FIG. 4d (at the point P4), that is to say at the output of the command signal regulation device 30, the command signal is inverted (because of the passage through the transistor T1) relative to that illustrated in FIG. 4c and it is referenced at 0 volts. The command signal has a constant mean value and it has a maximum voltage value V4 (of the order of 2.5 volts) that is markedly less than VBAT, which is included in the power supply voltage window F of the microcontroller 22 of the sensor 20.

The command signal thus formed can be processed by the microcontroller 22 of the sensor 20 as a command signal of the Manchester signal type, that is to say that the command signal obtained in FIG. 4d is encoded according to an alternation of state transition, a state "0" corresponding, for example, to the command signal at the voltage value V4 for a determined period t1, and a state "1" corresponding to the command signal at the voltage value V4 for a determined period t2, different from t1. A series of 0 and 1, thus recognized by the microcontroller 22 of the sensor 20 makes it possible to form a message to command the switching on of the LED LED1 which it decodes.

In the illustrative example, in order to produce a signal of between 0 and 2.5 V at the input of the microcontroller 22 of the sensor 20, the value windows of the various components of the command signal regulation device 30 are as follows:
   the capacitor C1: from 4.7 nF to 100 nF,
   the first and second diodes D2, D3: standard diodes of the "BAS21" type,
   the first resistor R3: from 47 kΩ to 470 kΩ,
   the second resistor R4: from 10 kΩ to 100 kΩ,
   the third resistor R5: from 100Ω to 1 kΩ,
   the fourth resistor R6: from 1 kΩ to 100 kΩ.

When the microcontroller 22 of the sensor 20 receives this command signal, it then closes the switch S2 in order to make the call for current from the BCM 10 in order to switch on the LED LED1.

As explained above, the sending of the item of information concerning the detection of approach from the sensor 20 to the BCM 10 by means of the power supply line W1 remains identical to the prior art. A signal for the detection of approach and/or contact is sent by the microcontroller 22 of the sensor 20 in the form of calls for current to the BCM 10 which the microcontroller 11 of the BCM 10 detects and decodes.

This detection signal lasts only a few milliseconds and is of fixed frequency; it is sent only when the microcontroller 22 of the sensor 20 detects that the voltage at the terminals of the electrode 23 has reached a threshold.

Since this signal is of fixed frequency, between each period of this signal, the power supply line W1 can be used by the BCM 10 for sending the command signal for switching on the LED LED1 to the sensor 20. For this it is sufficient that the command signal is inserted between two consecutive detection signals in order to prevent collisions between these two signals. The command signal may have a different frequency or the same frequency as that of the received signal.

It should be noted that the command signal to switch on the LED LED1 of the BCM 10 to the sensor 20 may be dependent on other items of information originating from other sensors situated on the vehicle and received by the BCM 10. The logic of switching on the LED LED1 is managed by the microcontroller 11 of the BCM 10. The latter manages the communication on the power supply line W1 and hence the coordination between the receipt of the detection signal and the sending of the signal to command the switching on of the LED LED1.

The switch S3 of the command signal regulation device 30 is optional. It allows the microcontroller 22 of the sensor 20 to activate or deactivate its connection to the command signal regulation device 30. Therefore, if for example the microcontroller 22 of the sensor 20 detects that the LED LED1 is faulty, it can open the switch S3 and no longer receive the command signal from the BCM 10. The switch S3 also allows the microcontroller 22 of the sensor 20 to receive the command signal only at a fixed interval or following a precise event such as following a detection of approach and/or contact. This makes it possible to reduce the energy consumption of the microcontroller 22 of the sensor 20.

The invention therefore allows a two-way communication between the BCM 10 and the sensor 20 by means of the power supply line W1 by supplying, in the direction of communication from the BCM 10 to the sensor 20, a signal to command an actuator or another device incorporated into the sensor 20 (LED for example) in the form of a signal of which the mean value is constant and included in the power supply voltage window F of the microcontroller 22 of the sensor 20, that is to say formed such that it can be processed by the latter as a command signal of the Manchester type for example.

Naturally, the invention is not limited to the embodiment described and it can be envisaged to command an LED and an actuator together, via the power supply line W1 by using the invention. Another implementation of the invention consists in the calibration of the sensor, by sending by means of the command signal a listing to a calibration table of the sensor, depending on the environment in which it exists. In this case, the invention allows a generic sensor to be used on various vehicles and to be calibrated according to the data received from the BCM on each vehicle (dimensions of the handle, desired detection zone, etc.).

The invention claimed is:

1. A device for communication between a microcontroller (11) of an electronic module (10) and a microcontroller (22) of a sensor (20) in order to send a command signal from the microcontroller (11) of the electronic module (10) to the microcontroller (22) of the sensor (20), said microcontroller (22) of the sensor (20) being furnished with a power supply voltage window (F), and said sensor (20) being supplied with current by the electronic module (10) by means of a power supply line (W1) connected to a voltage source (VBAT), wherein:
   the electronic module (10) comprises a command signal generator (40) connected to the microcontroller (11) of the electronic module (10) and connected to the power supply line (W1), generating a voltage-modulation command signal on the power supply line (W1),
   the sensor (20) comprises a command signal regulation device (30) connected to the power supply line (W1) and to the microcontroller (22) of the sensor (20), the command signal regulation device (30) comprises:
a high-pass filter (FPH),
a voltage limiter (LT),
an open collector output (CO),
arranged such that the command signal at the output of the command signal regulation device (30) is a voltage signal of constant mean value and of which the value is included in the power supply voltage window (F) of the microcontroller (22) of the sensor (20).

2. The communication device as claimed in claim 1, wherein:
the high-pass filter (FPH) comprises a capacitor (C1) connected to a first resistor (R3) and second resistor (R4) mounted in parallel, and
the voltage limiter (LT) comprises a first and second diode (D2, D3), and,
the first diode (D2) is connected in the on-state direction from ground to the output of the capacitor (C1),
the second diode (D3) is mounted, in the on-state direction, in parallel with the second resistor (R4) which is connected to the output of the capacitor (C1),
the open collector output (CO) comprises a third and a fourth resistors (R5, R6) and a transistor (T1), and
the third resistor (R5) is connected in series to the second resistor (R4), and
the third resistor (R5) is connected to a base input of the transistor (T1), and
a transmitter output of the transistor (T1) is connected to ground and a collector output is connected in parallel to the microcontroller (22) of the sensor (20) and to the fourth resistor (R6).

3. The communication device as claimed in claim 2, wherein the command signal generator (40) comprises:
a switch (S4) connected to ground, and
a resistor (R2).

4. The communication device as claimed in claim 2, wherein:
the command signal regulation device (30) also comprises a switch (S3) connected to the microprocessor (22) of the sensor (20), and
the first resistor (R3) and the fourth resistor (R6) are connected to the switch (S3).

5. The communication device as claimed in claim 2, wherein:
the command signal is a signal for switching on a light source (LED1) and/or for controlling an actuator incorporated into the sensor (20).

6. The communication device as claimed in claim 2, wherein the command signal is a signal for calibrating the sensor (20).

7. The communication device as claimed in claim 2, wherein the sensor (20) is incorporated into a door handle of a motor vehicle and that the voltage (VBAT) is the voltage originating from the vehicle battery.

8. The communication device as claimed in claim 1, wherein the command signal generator (40) comprises:
a switch (S4) connected to ground, and
a resistor (R2).

9. The communication device as claimed in claim 1, wherein:
the command signal regulation device (30) also comprises a switch (S3) connected to the microprocessor (22) of the sensor (20), and
the first resistor (R3) and the fourth resistor (R6) are connected to the switch (S3).

10. The communication device as claimed in claim 1, wherein the command signal is a signal for switching on a light source (LED1) and/or for controlling an actuator incorporated into the sensor (20).

11. The communication device as claimed in claim 1, wherein the command signal is a signal for calibrating the sensor (20).

12. The communication device as claimed in claim 1, wherein the sensor (20) is incorporated into a door handle of a motor vehicle and that the voltage (VBAT) is the voltage originating from the vehicle battery.

13. A motor vehicle comprising a device for communication between a microcontroller (11) of an electronic module (10) and a microcontroller (22) of a sensor (20) in order to send a command signal from the microcontroller (11) of the electronic module (10) to the microcontroller (22) of the sensor (20), said microcontroller (22) of the sensor (20) being furnished with a power supply voltage window (F), and said sensor (20) being supplied with current by the electronic module (10) by means of a power supply line (W1) connected to a voltage source (VBAT), wherein:
the electronic module (10) comprises a command signal generator (40) connected to the microcontroller (11) of the electronic module (10) and connected to the power supply line (W1), generating a voltage-modulation command signal on the power supply line (W1),
the sensor (20) comprises a command signal regulation device (30) connected to the power supply line (W1) and to the microcontroller (22) of the sensor (20),
the command signal regulation device (30) comprises:
a high-pass filter (FPH),
a voltage limiter (LT),
an open collector output (CO),
arranged such that the command signal at the output of the command signal regulation device (30) is a voltage signal of constant mean value and of which the value is included in the power supply voltage window (F) of the microcontroller (22) of the sensor (20).

14. A motor vehicle comprising a device for communication between a microcontroller (11) of an electronic module (10) and a microcontroller (22) of a sensor (20) in order to send a command signal from the microcontroller (11) of the electronic module (10) to the microcontroller (22) of the sensor (20), said microcontroller (22) of the sensor (20) being furnished with a power supply voltage window (F), and said sensor (20) being supplied with current by the electronic module (10) by means of a power supply line (W1) connected to a voltage source (VBAT), wherein:
the electronic module (10) comprises a command signal generator (40) connected to the microcontroller (11) of the electronic module (10) and connected to the power supply line (W1), generating a voltage-modulation command signal on the power supply line (W1),
the sensor (20) comprises a command signal regulation device (30) connected to the power supply line (W1) and to the microcontroller (22) of the sensor (20),
the command signal regulation device (30) comprises:
a high-pass filter (FPH),
a voltage limiter (LT),
an open collector output (CO),
arranged such that the command signal at the output of the command signal regulation device (30) is a voltage signal of constant mean value and of which the value is included in the power supply voltage window (F) of the microcontroller (22) of the sensor (20), and wherein:
the high-pass filter (FPH) comprises a capacitor (C1) connected to a first resistor (R3) and second resistor (R4) mounted in parallel, and
the voltage limiter (LT) comprises a first and second diode (D2, D3), and,
the first diode (D2) is connected in the on-state direction from ground to the output of the capacitor (C1),
the second diode (D3) is mounted, in the on-state direction, in parallel with the second resistor (R4) which is connected to the output of the capacitor (C1),
the open collector output (CO) comprises a third and a fourth resistors (R5, R6) and a transistor (T1), and
the third resistor (R5) is connected in series to the second resistor (R4), and
the third resistor (R5) is connected to a base input of the transistor (T1), and
a transmitter output of the transistor (T1) is connected to ground and a collector output is connected in parallel to the microcontroller (22) of the sensor (20) and to the fourth resistor (R6).

\* \* \* \* \*